No. 709,705. Patented Sept. 23, 1902.
W. GROSVENOR & W. MILNER.
METALLIC WAGON BOX.
(Application filed May 3, 1902.)
(No Model.) 5 Sheets—Sheet 3.
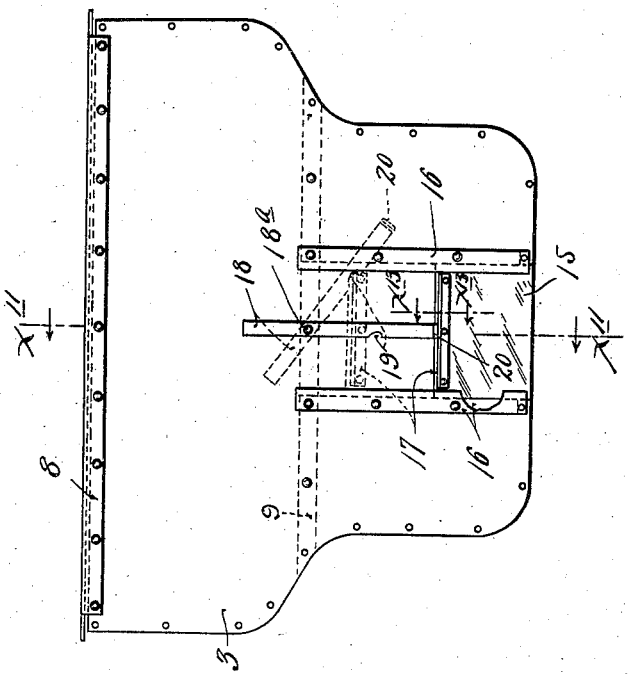
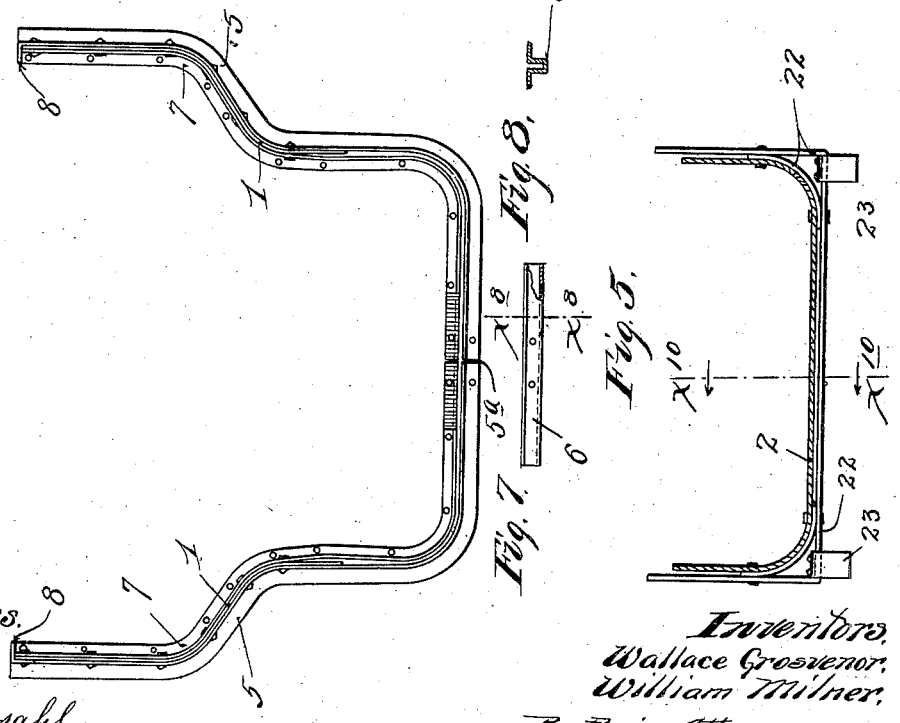

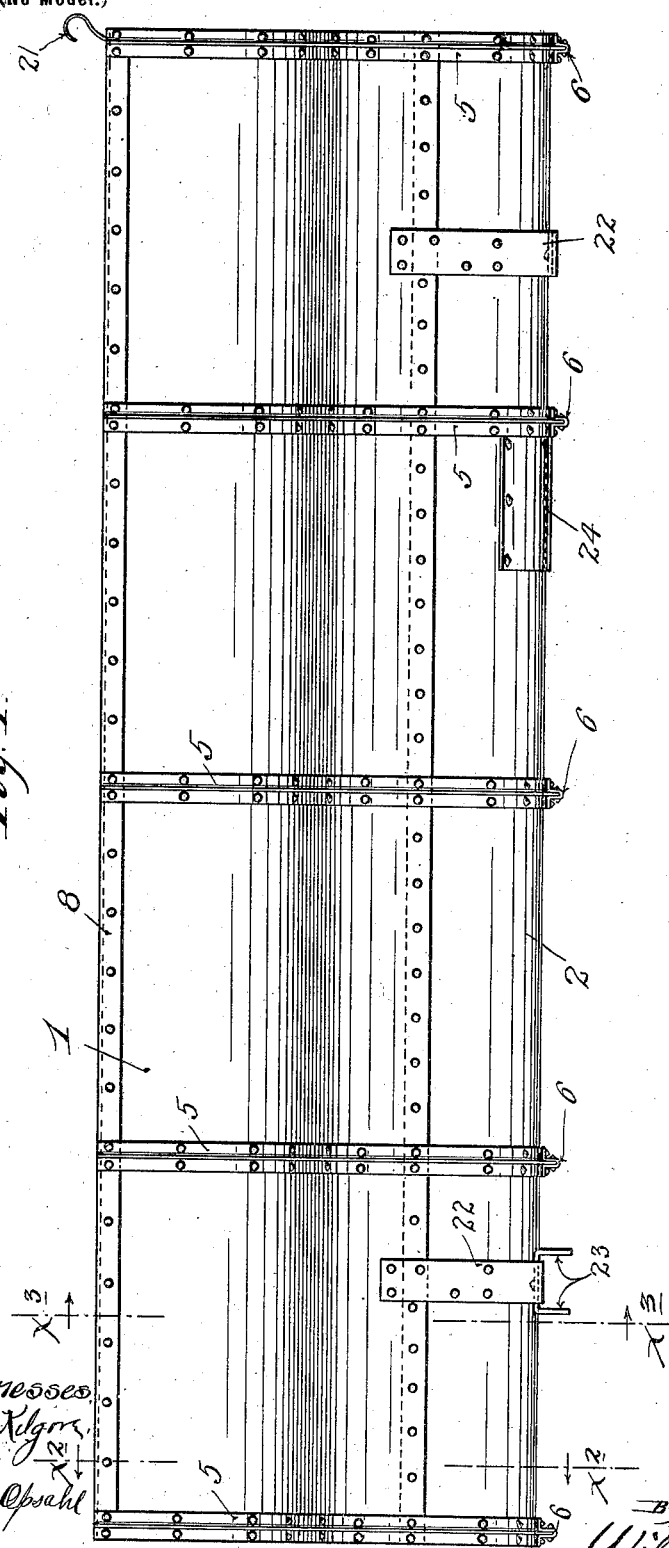

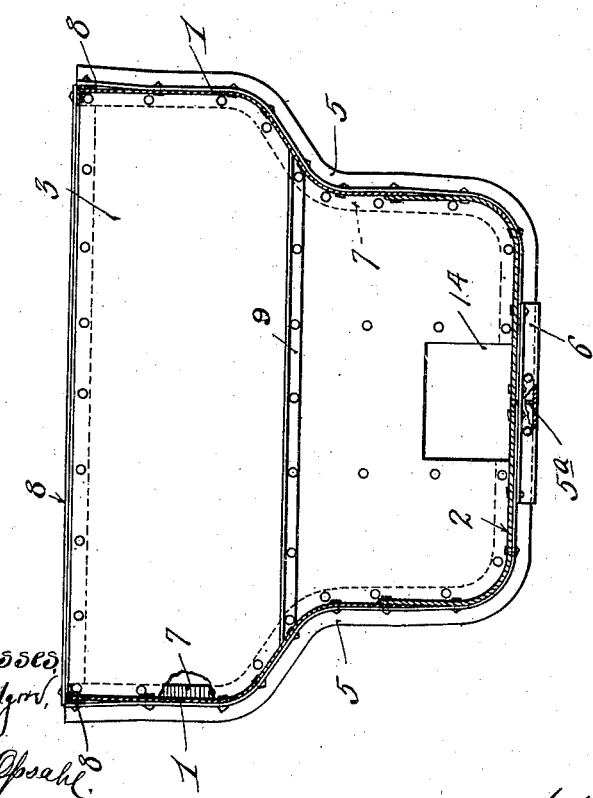

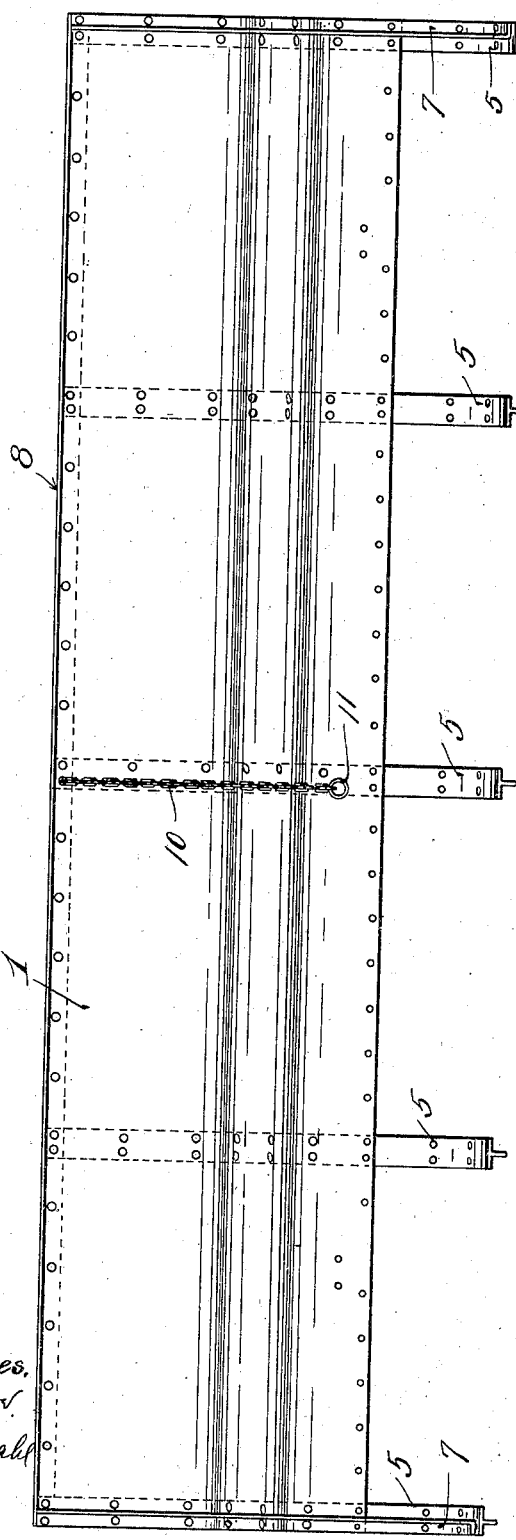

No. 709,705. Patented Sept. 23, 1902.
W. GROSVENOR & W. MILNER.
METALLIC WAGON BOX.
(Application filed May 3, 1902.)
(No Model.) 5 Sheets—Sheet 5.
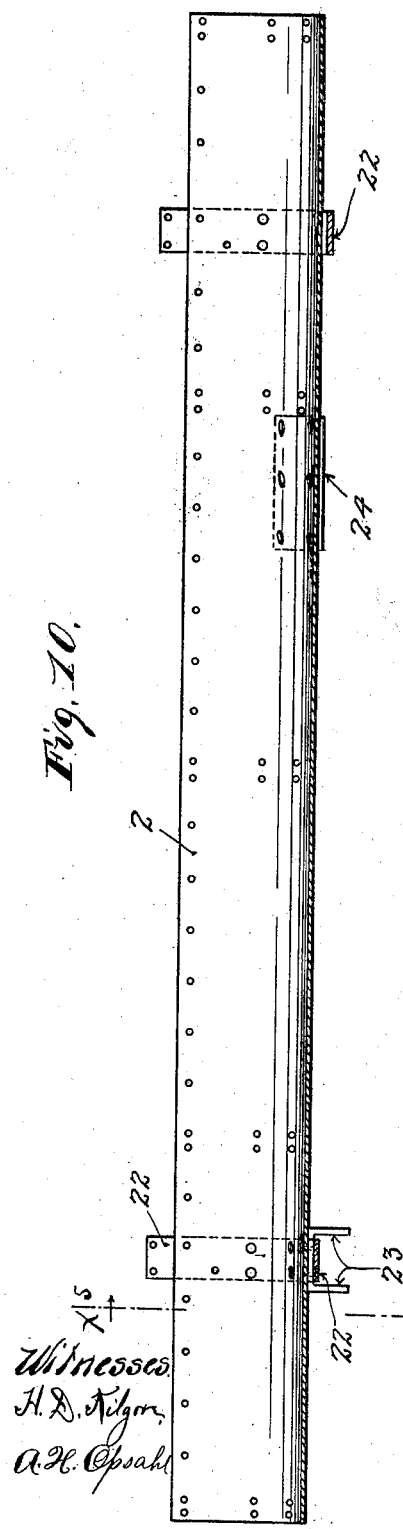
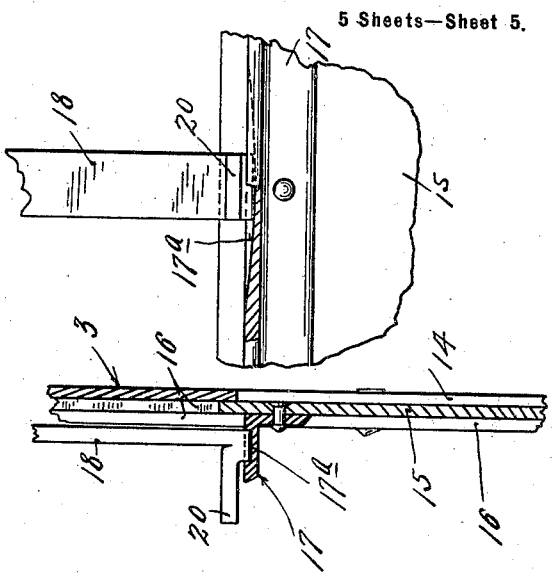
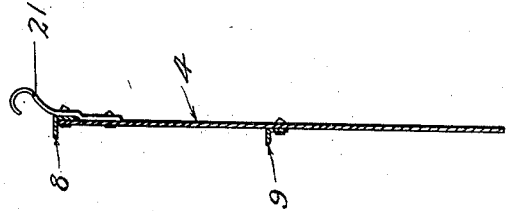
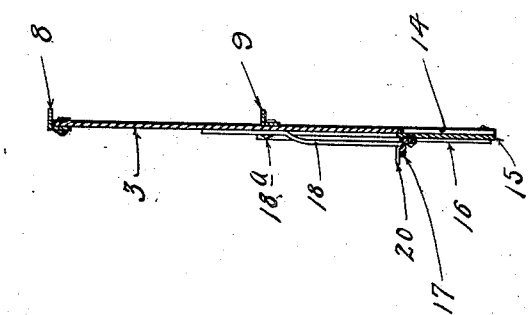
Inventors
Wallace Grosvenor,
William Milner,
By their Attorneys
Williamson & Merchant
Witnesses
H. D. Kilgore
A. H. Opsahl

UNITED STATES PATENT OFFICE.

WALLACE GROSVENOR AND WILLIAM MILNER, OF CASSELTON, NORTH DAKOTA.

METALLIC WAGON-BOX.

SPECIFICATION forming part of Letters Patent No. 709,705, dated September 23, 1902.

Application filed May 3, 1902. Serial No. 105,719. (No model.)

*To all whom it may concern:*

Be it known that we, WALLACE GROSVENOR and WILLIAM MILNER, citizens of the United States, residing at Casselton, in the county of Cass and State of North Dakota, have invented certain new and useful Improvements in Metallic Wagon-Boxes; and we do hereby declare the following to be a full, clear, and exact description of the invention, such as will enable others skilled in the art to which it appertains to make and use the same.

Our invention has for its object to provide a metal wagon-box of improved construction; and to this end it consists of the novel devices and combinations of devices hereinafter described, and defined in the claims.

More specifically stated, our invention has for its especial object to provide an improved metallic wagon-box which may be formed in sections at the factory, packed in close compass for shipment, and thereafter readily put together at the point of destination. The importance of such construction becomes evident when it is considered that completed wagon-boxes are very bulky and hence that but very few of the same can be placed on a car for shipment, thus making the shipping rates extremely high. By forming the box in sections which may be packed closely together a large number of boxes may be shipped on a single car, so that the maximum weight or car-load thereof is made possible and the freight rates are thereby reduced to a minimum. The metallic construction in itself, regardless of its knockdown or sectional feature, has important points of advantage, as will hereinafter more fully appear.

The invention is illustrated in the accompanying drawings, wherein like characters indicate like parts throughout the several views.

Figure 1 is a side elevation showing a completed wagon-box designed in accordance with our invention. Fig. 2 is a transverse vertical section taken on the line $x^2$ $x^2$ of Fig. 1. Fig. 3 is a transverse vertical section taken on the line $x^3$ $x^3$ of Fig. 1. Fig. 4 is an end view showing the ribs and side plates of the box, the ends and the bottom plate and certain other parts being removed. Fig. 5 is a section taken on the line $x^5$ $x^5$ of Fig. 10, showing secured thereto a bolster-engaging bracket. Fig. 6 is a rear end elevation of the rear end plate of the box. Fig. 7 is a detail looking from the rear of the machine, showing one of the coupling-channels removed from the ribs shown in Fig. 4. Fig. 8 is a detail in section on the line $x^8$ $x^8$ of Fig. 7. Fig. 9 is a side elevation looking from the inside of the box, showing one of the side plates of the box and the ribs which are secured thereto. Fig. 10 is a longitudinal section taken through the bottom plate of the box on the line $x^{10}$ $x^{10}$ of Fig. 5. Fig. 11 is a vertical section through the rear plate of the wagon-box on the line $x^{11}$ $x^{11}$ of Fig. 6. Fig. 12 is a vertical section through the front end plate of the box on the line $x^{12}$ $x^{12}$ of Fig. 3. Fig. 13 is a detail in section, on an enlarged scale, taken approximately on the line $x^{13}$ $x^{13}$ of Fig. 6; and Fig. 14 is an elevation of the parts shown in Fig. 13 looking at the same from the rear end of the box, some parts being broken away.

The numerals 1, 2, 3, and 4 indicate, respectively, the side plates, the bottom plate, the rear end plate, and the front end plate of the box, which parts are formed of thin metal, preferably of thin steel plates. The side plates 1 at their upper and lower portions extend vertically, but at their intermediate portions are given a compound curve outward, so as to form inclined outwardly-diverging surfaces above the wagon-wheels and serve to expand the upper portion of the box.

The bottom plate 2 is of channel form, and its upturned side flanges are adapted to be overlapped with and riveted to the depending or lower edges of the side plates 1, as best shown in Figs. 1, 2, and 3.

The rear end plate 3 and front end plate 4 are formed by flat sheets of metal and are given the form best illustrated in Fig. 6, so that when the parts are put together, as best shown in Figs. 2 and 3, they fit in between the side plates and bottom plate and assist in bracing the same. The side plates are connected to the bottom plate by approximately U-shaped ribs 5, which are riveted thereto and are preferably formed of T-iron. These ribs 5 are divided or sectioned at the center of the bottom plate 2, as indicated at $5^a$, but when the box is completed are rigidly secured by means of channel-like coupling-strips 6 (shown in detail in Figs. 7 and 8) and which when applied in working position embrace the projecting flanges of said ribs and are riveted thereto, as best shown in Figs. 1 and 2.

Two of the ribs 5 are located at the extreme ends of the box, and in line therewith interior lining-ribs 7 are riveted to the side and bottom plates and to the flanges of the said end ribs. These lining-ribs are best shown in Figs. 3, 4, and 9. The lining-ribs 7 are preferably formed of angle-iron. The end plates 3 and 4 are riveted to the adjacent flanges of these lining-ribs 7. To the upper edges of the side plates 1 and end plates 3 and 4 are riveted angle-irons 8, the upper flanges of which turn inward and serve to prevent grain from being blown out over the upper edge of the box. These angle-irons 8 also serve to stiffen the plates to which they are applied. The end plates 3 and 4 are shown as further stiffened by transversely-extended angle-iron strips 9, (shown as riveted to the inner faces thereof,) as best shown in Figs. 2 and 3. To prevent the sides of the box from bulging or spreading apart when heavily loaded with grain, a chain 10 is extended between the upper and central portions of said sides, being preferably secured at its ends, not only to said sides, but also to the stiffening-angles 8 and the central member of the ribs 5. This chain is formed with separable sections, one of which sections terminates in a coupling-ring 11, and the other of which is provided at its free end with a cooperating coupling-hook 12, adapted to be held in working position by a ring 13 on the said latter-noted chain-section. As is evident, the hook 12 may be readily detached from the ring 11, thus disconnecting the chain-sections and permitting the same to be thrown outward over the sides of the box, where they will be entirely out of the way when not in use.

The rear end plate 3 is provided at its lower portion with a gate-opening 14, which is adapted to be normally closed by a gate 15, which is mounted to move vertically in guide-strips 16, riveted to the said plate 3. To the upper end of the gate 15 is riveted a stop-strip 17, preferably of angle-iron and provided in its upper face with a depression 17$^a$.

A lock-lever 18 is pivoted at 18$^a$ to the plate 3 and is provided at one side with a notch 19. At its lower free end the lock-lever 18 is shown as provided with a projecting finger 20, by means of which it may be operated. When the gate 15 is lowered, as shown in Figs. 6, 11, and 13, the lower free end of the lever 18 falls into the notch 17$^a$ of the strip 17 and securely holds the gate in its closed position. When the lever 18 is swung to one side, as shown by dotted lines in Fig. 6, the gate may be raised and then held in its raised position by engaging the notch 19 of said lever with one end of the strip.

21 indicates a rein-holder which, as shown, is secured to the front plate 4.

22 indicates bolster-brackets which are adapted to rest upon the bolsters of the wagon and which are riveted to the bottom plate and sides of the box, as best indicated in Figs. 1 and 3. The rear bracket 22 is provided with pronged keepers 23, which are adapted to embrace the rear bolster of the wagon and prevent the box from sliding endwise.

24 indicates rubbing or wearing plates which, as shown, are secured to the bottom plate 2 in position to be engaged by the front wheels of the wagon in turning.

At the factory the ribs 5 and 7 are riveted to the side plates 1, as indicated in Figs. 4 and 9, and the bolster-brackets 22 are riveted to the bottom plate 2, as indicated in Figs. 5 and 10; also, the stiffening-strips 8 are riveted to the side plates 1 and end plates 3 and 4. The gate devices are of course also applied to the rear plate 3. The end plates are not of course at such time riveted to the side or bottom plates, and coupling-channels 6 are of course shipped loose and applied to the ribs later.

The sections formed as just described may, as is evident, be very closely packed for the purposes of shipment.

To set up the box after it reaches its destination, it is necessary first to slip the ends of the bottom plate 2 into the channel-like space left between the end ribs 5 and the lining-ribs 7 and then rivet the flanges of the said ribs to the ends of the said bottom plate. The intermediate ribs 5 are also riveted to the bottom plate 2. Then the coupling-channels 6 are riveted onto the projecting flanges of the abutting ends of the sections of the ribs 5. The upper edges of the channel-like bottom plate 2 is, as already indicated, overlapped with the lower edges of the side plates 1 and are also riveted thereto after the parts are set up, as just indicated. The end plates 3 and 4 are next placed in working position and riveted to the inturned flanges of the lining-ribs 7. As will be noted by reference to Fig. 4, the sections of the lining-ribs 7 at the rear end of the box are terminated short of each other to prevent them from crossing the gate-opening 14. When the parts are riveted together, as above indicated, the box is complete.

It will of course be understood that the box above specifically described is capable of many modifications within the scope of our invention as herein set forth and claimed.

The box instead of being made with a complete bottom plate separable from both sides of the box might be formed by extending downward the side plates, so that each would form one-half of the bottom plate. Such construction, however, would not be the full equivalent of the construction above described, for the reason that a seam would be formed at the bottom of the box which would be subject to wear and would make the cleaning of the box with a shovel more difficult and for the further reason that with this suggested modification the bottom of the box would be formed of metal having the same thickness as the sides, whereas in the construction illustrated in the drawings the bottom plate may be formed of sheet metal which is materially heavier, thicker, and stronger than the said side plates.

It is of course also evident that the box might be provided with a gate in its bottom or in its side, for that matter, in which case it might or might not also be provided with a gate in its rear end plate. Other modifications as to details of construction may also be made within the scope of our invention.

What we claim, and desire to secure by Letters Patent of the United States, is as follows:

1. A metallic wagon-box comprising metallic side plates, channel-like bottom plates, and flat end plates, in combination with sectional metallic ribs secured to said side and bottom plates and connecting the same and joint-irons connecting the abutting ends of the rib-sections, substantially as described.

2. A metallic wagon-box comprising the bent side plates 1, channel-shaped bottom plate 2 and flat end plates 3 and 4, in combination with the sectional ribs 5 secured to said plates 1 and 2, and the channel-shaped couplings 6 embracing and riveted to the flanges of said ribs 5, at their abutting ends, substantially as described.

3. A metallic wagon-box comprising the side plates 1, channel-like bottom plate 2 and end plates 3 and 4, in combination with the ribs 5 and 7 connecting the said plates 1 and 2 together and said ribs 7 being riveted to said end plates, and the coupling-channels 6 riveted to the flanges of said ribs 5, at their abutting ends, substantially as described.

4. A metallic wagon-box having metallic side and end plates and metallic ribs and reinforcing angle-irons secured to the upper edges of the side and end plates with their flanges projecting inward over the upper end of the box and serving as wind-guards, substantially as described.

In testimony whereof we affix our signatures in presence of two witnesses.

WALLACE GROSVENOR.
WILLIAM MILNER.

Witnesses:
A. M. DYER,
H. G. SCOTT.